US005714213A

United States Patent [19]

Antes et al.

[11] Patent Number: 5,714,213

[45] Date of Patent: Feb. 3, 1998

[54] SECURTIY ELEMENT

[75] Inventors: Gregor Antes, Zürich; Walter Trächslin, Walchwil, both of Switzerland

[73] Assignee: Landis & Gyr Betriebs AG, Zug, Switzerland

[21] Appl. No.: 226,379

[22] Filed: Apr. 12, 1994

Related U.S. Application Data

[63] Continuation of Ser. No. 933,986, Aug. 21, 1992, abandoned.

[30] Foreign Application Priority Data

Oct. 14, 1991 [CH] Switzerland .................... 03 006/91-8

[51] Int. Cl.$^6$ .............................. B24D 15/00; B44F 1/10; B32B 1/00

[52] U.S. Cl. .............................. 428/30; 101/28; 283/72; 283/91; 428/142; 428/187; 428/458; 428/908; 428/913; 428/916

[58] Field of Search .............................. 283/86, 72, 77, 283/91, 94, 108, 109, 92; 428/30, 29, 67, 142, 156, 13, 458, 908, 916, 913, 187; 264/1.3, 1.7, 1.9, 293; 101/28, 29

[56] References Cited

U.S. PATENT DOCUMENTS

| | | | |
|---|---|---|---|
| 4,304,809 | 12/1981 | Moraw et al. | 428/195 |
| 4,568,141 | 2/1986 | Antes | 350/3.61 |
| 4,629,647 | 12/1986 | Sander | 428/172 |
| 4,662,653 | 5/1987 | Greenaway | 283/91 |
| 4,761,253 | 8/1988 | Antes | 264/1.3 |
| 4,892,385 | 1/1990 | Webster, Jr. et al. | 350/162.23 |
| 4,979,149 | 12/1990 | Popovic et al. | 365/244 |
| 4,984,824 | 1/1991 | Antes et al. | 283/91 |
| 5,044,707 | 9/1991 | Mallik | 283/93 X |
| 5,104,471 | 4/1992 | Antes et al. | 156/233 |
| 5,106,125 | 4/1992 | Antes | 283/91 |
| 5,145,212 | 9/1992 | Mallik | 283/86 |

FOREIGN PATENT DOCUMENTS

| | | |
|---|---|---|
| 0170832 | 2/1986 | European Pat. Off. . |
| 0439092 | 7/1991 | European Pat. Off. . |

*Primary Examiner*—Paul J. Thibodeau
*Assistant Examiner*—Stephen Sand
*Attorney, Agent, or Firm*—Meltzer, Lippe, Goldstein, Wolf & Schlissel, P.C.

[57] ABSTRACT

A security element for the authentication of a substrate has a pattern comprising optical diffraction elements which are embossed in a carrier material of plastic material and unembossed neutral areas. On the embossing side of the carrier material a reflecting layer covers only surfaces with relief structures of the diffraction elements while the neutral areas which lie between are free of the reflecting layer and are therefore non-reflecting. If the security element is stuck in the form of a stamp onto the substrate and the carrier material is transparent, image portions, which are covered by the stamp, of a feature on the substrate can be discerned through the neutral areas.

16 Claims, 3 Drawing Sheets

SECURTIY ELEMENT

This is a continuation of application Ser. No. 07/933,986, filed Aug. 21, 1992 now abandoned.

FIELD OF THE INVENTION

The invention relates to a security element. Such security elements are suitable for example for safeguarding a photograph which is stuck on a personal identity card, wherein the security element which is in the form of a stamp covers over both a part of the surface of the photograph and also a part of the surface of the identity card The invention also relates to a process for the production of such a security element.

DESCRIPTION OF THE PRIOR ART

European patent application EP-A-401 466 describes such a security element which has a reflection layer over its entire surface and shows a pattern which is composed of surfaces with embossed relief structures and unembossed surfaces arranged therebetween. When the security element is visually viewed, the reflection phenomena of high light intensity at the unembossed surfaces interfere with the full colour development of the light which is diffracted at the relief structures.

European patent EP 169 329 describes an apparatus for the production of dies with which the microscopic relief structures are embossed for example into plastic carries which are aluminised on one side. The improved apparatus disclosed in European patent application EP-A-330 738 permits the production of the dies which are required for embossing of the relief structures and which have surface portions with at least a dimension of less that 0.3 mm.

European patent application EP-A-253 089 discloses interrupting the reflection layer in the region of the relief structures in a predetermined pattern in order to achieve good adhesion between a carrier for the relief structures and a protective layer covering the latter.

European patent application EP-A-439 092 describes the use of the security element, with diffraction structures which are covered with the reflection layer in surface portions in a grid-like configuration for safeguarding identity certificates, wherein the features of the identity certificate which are covered by the security element can be discerned through non-reflecting surface portions in spite of a clouding effect due to the grid configuration.

OBJECT AND SUMMARY OF THE PRESENT INVENTION

The object of the invention is that of providing a security element having a pattern comprising relief structures with an optical-diffraction element and unembossed neutral areas, in which visual observation of the pattern is not disturbed by the light which is reflected at the neutral areas, and providing an inexpensive production process therefor.

In accordance with one aspect of the present invention, there provided a security element comprising a carrier layer of plastics material and a reflective layer, the carrier layer having a surface, least one portion of said surface being embossed with microscopic relief structures so that said embossed portion of said surface optically diffractive, at least one other portion of said surface being an unembossed neutral portion so that said embossed portion and said unembossed portion from a visible pattern, and said reflective layer coveting only said microscopic relief structures so that said unembossed portion is not reflective.

In accordance with another aspect of the present invention, there is provided a process tot producing a security element, comprising steps of: embossing a surface of a plastics carrier layer through reflective layer cart led by said surface of said carrier layer so as to produce optically diffractive microscopic relief structures in at lest one portion of said surface and so as to leave at least one portion of said surface as an unembossed neutral portion; covering only microscopic relief structures with a protective lacquer so that said neutral portion remains substantially free of said protective lacquer; removing said reflective layer from said carrier layer to expose said unembossed neutral portion; and applying a protective layer over the reflective layer in said embossed portion and the carrier Layer in the unembossed portion.

In accordance with a further aspect of the present invention, there is provided a process for producing a security element, comprising the steps of: embossing a surface of a plastics carrier layer using an embossing die having raised embossing relief structures to produce embossed optically diffractive microscopic relief structures in at least one portion of said surface of said carrier layer and so as to leave al least one portion of said surface as an unembossed neutral portion; covering said unembossed neutral portion with a separating layer of material which can be washed off or otherwise chemically removed; covering said microscopic relief structures in said embossed portion and said separating layer in said unembossed portion with a reflecting layer; removing said separating layer together with said reflecting layer in said unembossed portion; and applying a protective layer over said carrier layer cover said carrier layer in said unembossed portion and said reflective layer in said embossed portion.

Other objects, features and advantages of the present invention will become apparent upon consideration of the following detailed description of a preferred embodiment thereof, especially when considered with the accompanying drawings in which like reference numerals are employed to designate the same or similar components the different figures.

DETAILED DESCRIPTION OF THE PREFERRED EMBODIMENTS

Figure 1:
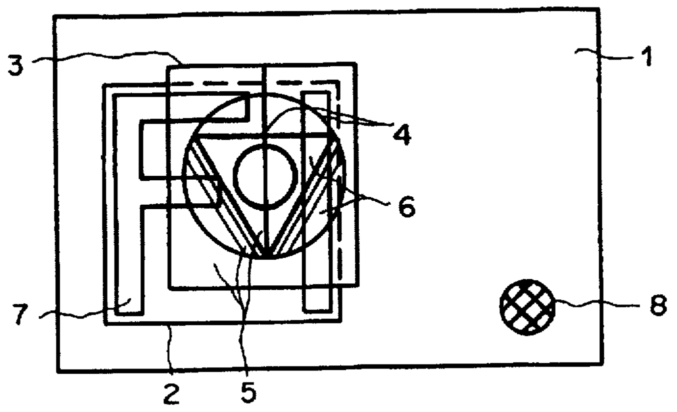
FIG. 1 shows an identity card or pass with d security element.

In FIG. 1, reference numeral 1 identifies a substrate comprising paper, plastic material, metal and the like, on the surface of which is disposed a feature 2. A stamp 3 of plastic material, as a security element, covers over adjacent surface portions of the substrate 1 and the feature 2, wherein the stamp 3 is stuck with one surface portion onto the feature 2 and with the other surface portion onto the substrate 1. The substrate 1 can be an identity card or pass, in which case the feature 2 can be a photograph of the owner, a signature which is written before the stamp 3 is applied, or another distinguishing mark.

The stamp 3 has a pattern which is composed of surfaces with an optical-diffraction effect, with diffraction elements 4, and neutral areas 5. The diffraction elements 4 diffract the incident ambient light in a reflection mode and produce a characteristic colour image which alters when the substrate 1 is tilted. The neutral areas 5 do not reflect; they are for example absorbent or transparent. If the neutral areas 5 are transparent, only a low degree of reflection can be observed in the areas 5 at the surface of the stamp 3, because of the sudden change in the indices of refraction of the media (air-plastic material), without however that disturbing either the colour image or observation of the substrate 1 or feature 2 which is visible at that location, through the stamp 3.

The security element has a particularly advantageous effect in a visual observation situation if the diffraction elements 4 are for example of linear configuration and form filigree patterns on the security element. Those patterns have the advantage that the feature 2 which is under the stamp 3 can be easily discerned, in particular if the lines of the diffraction elements 4 are as narrow as possible. The line widths can be smaller than 0.5 mm, for example 0.1 mm, 0.05 mm or even narrower. It is also possible to use a dot grid or a pattern which is made up of dots, in which case the diameter of the diffraction elements 4 which are in the form of dots approximately corresponds to the above-indicated line widths. Line widths of from about 25 μm can be achieved with the means which are described in EP-A-330 738 (corresponding to U.S. Pat. No. 4,984,824) bearing the title "Document" by Antes et al. and the text of which is expressly incorporated into this description. At any dot or line portion, it is possible to produce an individual diffraction element which differs in terms of its parameters, spatial frequency and grid profile from the adjacent dots or line portions. The change in the parameters from one diffraction element 4 to the other can serve as for example means of graphic configuration for enhancing the level of security.

For discernibility of a non-forged feature 2, it is advantageous for the pattern on the security element to be so designed that the sum of the surface areas of the neutral areas 5 which are between the diffraction elements 4 is greater than the sum of the surface areas of the diffraction elements 4.

The security element has the advantage that, due to reflection of the diffracted light, the diffraction elements 4 contrast in a highly conspicuous fashion from the neutral areas 5 having a low level light intensity and at which there is no reflection and diffraction of which can mix with the play of colours of the diffracted light and reduce the brilliance of the diffraction elements 4. As the image portions 6 of the feature 2 which are beneath the neutral areas 5 can be discerned through the neutral areas 5 and those with the image portions 7 which are not covered by the stamp 3 must provide a complete image in respect of the feature 2, the stuck-on stamp 3 is also suitable as a security element for authentication of the feature 2, not only being distinguished by the high level of visibility of the diffraction elements 4 and the transparency in the neutral areas 5 but also affording a visual checkable high level of security against forgeries in regard to authentication of the feature 2.

If the substrate 1 comprises plastic material, as for example in the case of a credit card, a brilliant optical-diffraction identification characteristic 8 with such a pattern, as a security element, can also be produced directly in the surface of the substrate 1, without proceeding indirectly via a stuck-on stamp 3.

Figure 2:
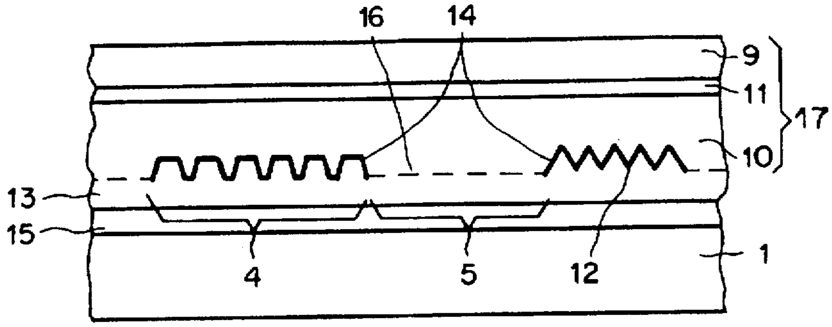
FIG. 2 shows a stamp in cross-section.

FIG. 2 is a view in cross-section through the identity card with the stamp 3 which is stuck on the substrate 1, as the security element. Shown by way of example is a composite layer configuration which is described in European patent application EP-A-401 466 (corresponding to U.S. Pat. No. 5,104,471) under the title "Composite layer configuration with diffraction structures" to the same applicant, the text of which is expressly incorporated into the present description.

Enclosed between the substrate 1 and a stabilization layer 9 of polyester is a carrier 10 of plastic material for the diffraction elements 4. A lacquer layer 11 provides good adhesion between the stabilization layer 9 and the carrier 10. The diffraction elements 4 are embossed into the carrier 10, in the form of microscopically fine relief structures 12. A protective layer 13 provides cover over the full surface both for the relief structures 12 which are covered with a reflective layer 14 and also the unembossed and non-reflecting neutral areas 5 of the carrier 10. An adhesion layer 15 which is applied to the protective layer 13 fixedly joins the stamp 3 (see FIG. 1) to the substrate 1, in which respect the adhesive join can be released without any disturbance to the security element.

Advantageously, the carrier 10 and the protective layer 13 comprise the same material so that the carrier 10 and the protective layer 13 can be particularly intimately joined in the neutral areas 5, so that no weak point is formed at the join and the protective layer 13 can be removed for forming the relief structures 12, without destroying same. If the carrier 10 and the protective layer 13 are of the same clear material, an undisturbed carrier surface 16 which is present in the unembossed neutral areas 5 is invisible. The carrier surface 16 is therefore shown in broken line in the drawing. The neutral areas 5 therefore remain completely clearly transparent and do not disturb discernibility of the feature 2 which is under the stamp 3 (FIG. 1). It will be noted however that the carrier 10 and the protective layer 13 may also be differently coloured. Instead of the composite layer material, it is also possible to use a solid foil, for example consisting of PVC, as a carrier material 17.

If the stamp 3 is to be used for sticking onto the substrate 1, transparent or completely colourless materials are advantageously used for the protective layer 13, the adhesive layer 15 and the carrier material 17 so that the feature 2 (see FIG. 1) remains visible through the neutral areas 5.

In another configuration, the carrier 10 itself is sufficiently stable so that the stabilization layer 9 and the lacquer layer 11 are unnecessary.

Production of the security feature is distinguished by a small number of characteristic steps in the process, which can be seen from the production processes set forth as examples. For example, in comparison with the state of the art (EP-A-401 466), only a small number of additional steps have to be included in the processes described hereinafter, but, as described below, those steps are of different natures. Each of those processes has its advantages.

By way of example, FIGS. 3*a* through 3*d*, FIGS. 4*a* through 4*c* and FIGS. 5*a* through 5*d* show in sections the stepwise production of a preliminary material in strip form for stamps 3 (see FIG. 1) with the security element. To show the successive steps in the processes, those drawings are turned through 180° relative to FIG. 2. The strip form makes it possible to use a continuous process and is therefore suitable for inexpensive mass production.

Figure 3A:
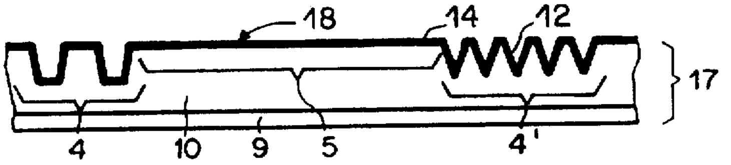
FIG. 3*a* through 3*d* shows the operation of covering relief structures with a protective lacquer by means of a printing
Figure 3B:
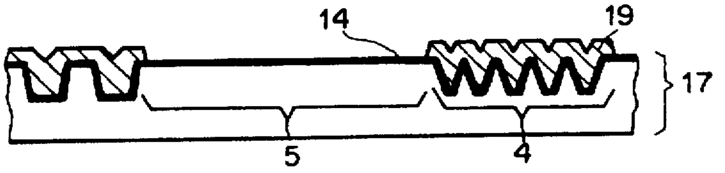

In FIG. 3*a* the carrier material 17 in strip form comprises for example the stabilization layer 9 and the carrier 10 which are joined to the lacquer layer 11 (see FIG. 2). The carrier material 17 is covered with a reflecting layer 14 over its full area on the side remote from the stabilization layer 9, the embossing side. For example, aluminium layers which are applied by vapour deposition and the thickness of which is only fractions of a micrometer are known as the reflecting layer 14.

The carrier material 17 is withdrawn in the form of a strip from a supply roll (not shown) and passes successively into the different processing regions in which the stamps 3 (see FIG. 1) with the security feature are produced step by step.

Process 1

In the first step (FIG. 3*a*), using for example heated embossing dies, the microscopic relief structure 12 in the pattern of the security element is embossed into an embossing side 18 of the carrier material 17, the side 18 being characterized by the reflecting layer 14. A respective one of the unembossed neutral areas 5 is enclosed between each two diffraction elements 4 and 4

In the second step (FIG. 3*b*), a protective lacquer 19 is applied by means of a printing process to the embossed diffraction elements 4 in aligned relationship in the register of the patterns of the diffraction elements 4 (="in accurate register relationship"), which protective layer accurately covers the reflecting layer 14 on the surfaces of the diffraction elements 4 and leaves the layer 14 free and exposed on the neutral areas 5. The protective lacquer 19 is for example clearly transparent or coloured and only transparent in relation to light from a predetermined range of the spectrum.

The strip of carrier material 17 is then drawn through a chemical bath. In the bath, the exposed reflecting layer 14 on the neutral areas 5 is removed. If the reflecting layer 14 comprises aluminium, a suitable chemical bath is for example dilute caustic soda solution.

Figure 3C:
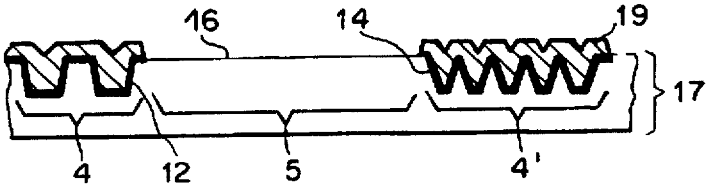

After the washing and drying operations, the carrier material 17 has the structure shown in FIG. 3*c*. The reflecting layer 14 applied to the embossed relief structures 12 is only present and covered with the protective lacquer 19, in the region of the diffraction elements 4, 4'. The unembossed neutral areas 5 which are between the diffraction elements 4, 4' are no longer covered with the reflecting layer 14, the unembossed carrier surface 16 of the carrier material 17 being exposed.

Figure 3D:
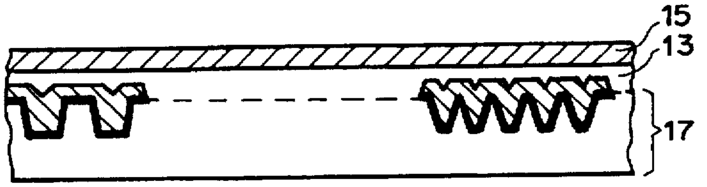

In the last working operation, the preliminary material for stamps, which is shown in FIG. 3*d*, is finished, in which operation the protective layer 13 is firstly applied to the carrier material 17 on the embossing side 18 (FIG. 3*a*), over the entire surface area involved, and lastly the adhesive layer 15 is applied.

The adhesive layer 15 may also be omitted if, immediately prior to the operation of sticking the stamp 3 (FIG. 1) onto the substrate 1 (FIG. 1), the adhesive is applied to one of the two adhering components 1, 3 or the protective layer 13 is in the form of an adhesive layer 15.

That process has the advantage that the embossing dies used for production of optical-diffraction patterns in accordance with the state of the art can also be used to produce the novel security elements so that new embossing dies do not have to be produced.

Process 2

The carrier material 17 which is embossed through the reflecting layer 14 in FIG. 4*a* has been embossed by means of an embossing die described hereinafter, with raised embossing structures. As a result, the relief structures 12 which are embossed into the carrier 10 (see FIG. 2) are lowered by a predetermined distance A into the carrier material 17, that is to say, beneath the carrier surface 16, with depressions 21 being produced. The distance A is measured between the surface of the carrier material 17 and the tips 20, which are closest thereto, of the relief structure 12.

For example, that distance A is between about 1 μm and 5 μm, while the relief structure 12 has differences in height as indicated at B of 1 μm or less. The relief structures 12 are embossed on the floor of the depressions 21 and may therefore also involve differences in height as indicated at B of more than 1 μm. As a result, the carrier material 17 in FIG. 4*a* has a mesa structure, with the unembossed areas 5 representing the plateau and the depressions 21 with the relief structures 12 representing the dips or valleys.

Figure 4A:
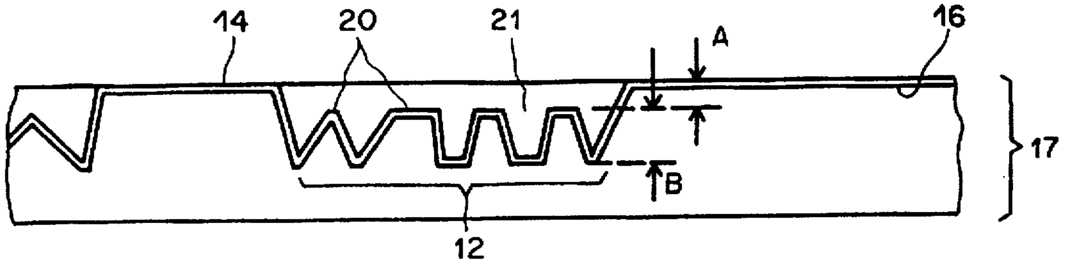
FIG. 4*a* through 4*c* show the operation of covering the relief structures with the protective lacquer by an intaglio printing process.
Figure 4B:
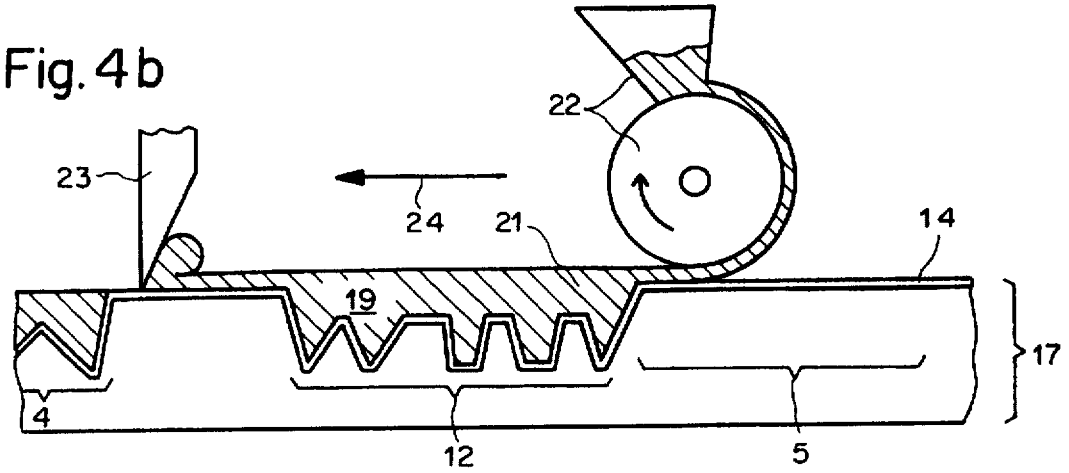

Application of the protective lacquer 19, as shown in FIG. 4*b*, is effected when the carrier material 17 passes through an applicator mechanism 22, 23 which is known in the printing art for intaglio printing. The carrier material 17 moves in a transportation direction 24 from the roller support frame 22 to the scraper blade 23 comprising for example plastic or rubber material. The scraper blade 23 is arranged above the carrier material 17, and the edge of the scraper blade 23 can slide in lightly resilient contact against the reflecting layer 14 over the entire width of the carrier material 17 for removal of the excessive protective lacquer 19.

The protective lacquer 19 is uniformly distributed over the reflecting layer 14 as the carrier material 17 passes through the arrangement. By virtue of selection of the appropriate properties for the protective lacquer 19 such as viscosity, wetting etc., the numerical values of which are ascertained by testing, the protective lacquer 19 also fills in particular the depressions 21 and covers over the relief structures 12. The scraper blade 23 scrapes the protective lacquer 19 which is on the unembossed neutral areas 5 off the reflecting layer 14 so that the protective lacquer 19 then only remains in the depressions 21 and protects the reflecting layer 14 of the diffraction elements 4 from the effect of the chemical bath for removal of the reflecting layer 14.

Figure 4C:
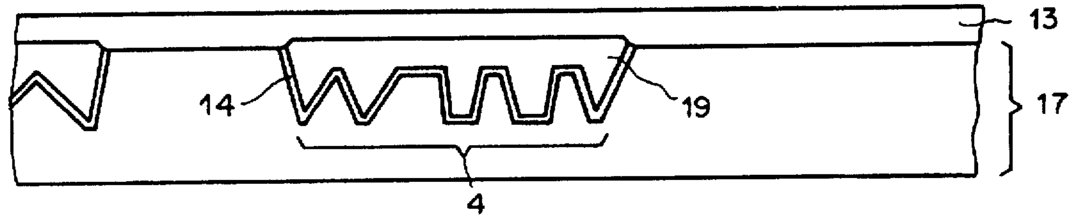

Subsequently to the operation of drying the protective lacquer 19, the strip of carrier material 17 is drawn through the chemical bath and the exposed reflecting layer 14 is removed in the areas 5, as in process 1. FIG. 4*c* shows the preliminary material which is in the finished state, by way of example, in which the reflecting layer 14 has remained only on the diffraction elements 4. Only the protective layer 13 is present on the carrier material 17, over the entire surface area.

That process has the advantage that there is no need for operating in accurate register relationship when applying the protective lacquer 19 as that occurs automatically and with a high level of precision. It is even possible for the embossing operation and the step of applying the protective layer 13 and the protective lacquer 19 to be carried out at different production locations without that adversely affecting the accuracy with which the reflecting layers 14 are restricted to the diffraction elements 4.

The arrangement of the relief structures 12 on the floor of the depressions 21 in the carrier material 17 is advantageous as that provides maximum protection for the relief structures 12 (FIG. 4*b*) when the diffraction elements 4 are being covered with the protective lacquer 19. For the sake of completeness it should also be mentioned that application of the protective lacquer 19, in accordance with process 1, can also be carried out on the carrier material 17 with the mesa structure.

Process 3

Figure 5A:
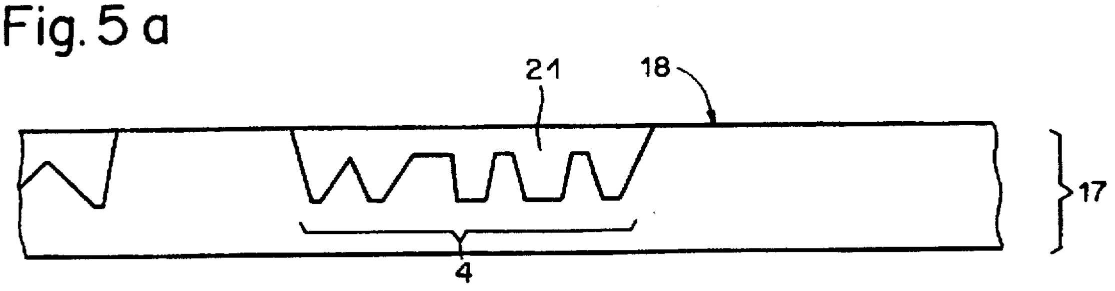
FIG. 5*a* through 5*d* show the operation of covering the structures with a protective lacquer by a relief printing process.

Production of the security elements can also be carried out with a starting material as the carrier material 17 which, as shown in FIG. 5a, does not have a reflecting layer 14 (FIG. 3a) on the embossing side 18. As in process 2, the diffraction elements 4 and the depressions 21 in the carrier material 17 are produced by means of the embossing die with raised embossing structures.

Figure 5B:
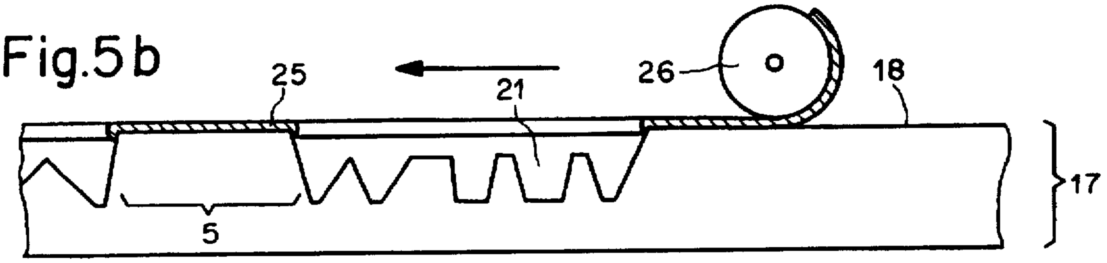

After the operation of embossing the carrier material 17, a printing mechanism which is known from relief printing and which is illustrated here only by means of its applicator roller 26 is used to apply in accurate register relationship to the surfaces of the unembossed neutral areas 5 in FIG. 5b a material which can be washed off, as a separating layer 25, in accordance with EP-A-253 089. The roller 26 rolls against the embossing side 18 of the carrier material 17 and covers the raised neutral areas 5 with the separating layer 25. The viscosity and thickness of application of the material which can be washed off are so selected that that material does not fill the depressions 21 and contaminate the relief structures 12 (see FIG. 2). Therefore the separation layer 25 only covers over the neutral regions 5 and the relief structures 12 which are embossed in the depressions 21 remain free.

Figure 5C:
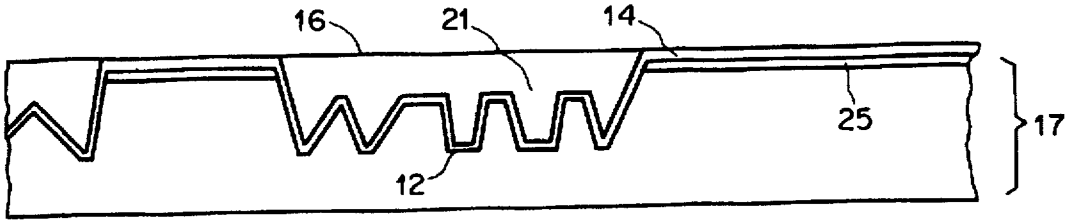

As can be seen from FIG. 5c, the carrier material 17 which is partially covered with the separating layer 25 is then coated with the reflecting layer 14, both on the relief structures 12 in the depressions 21 and also on the separating layer 25.

Figure 5D:
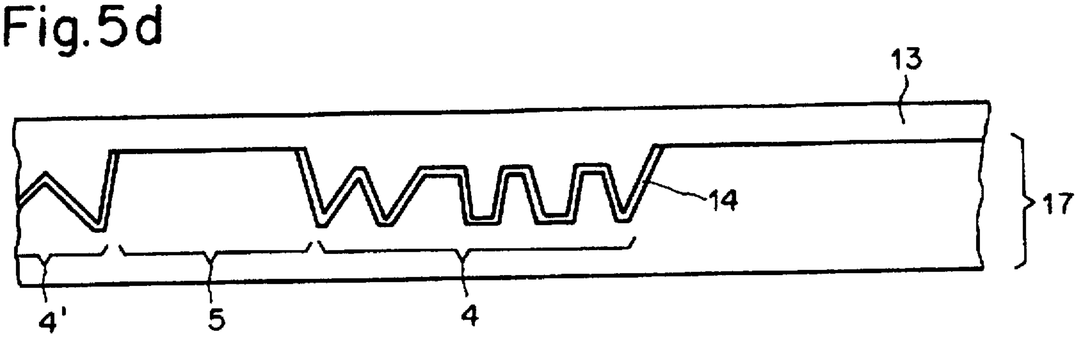

After a washing operation which removes the wash-off material of the separating layer 25 together with the reflecting layer 14 directly applied thereto, in FIG. 5d the preliminary material then only still has the reflecting layer 14 in the diffraction elements 4 while the carrier material 17 is exposed in the neutral areas 5. Finally, the full surface of the carrier material 17 is covered with the protective layer 13, the depressions 21 being filled with the material of the protective layer 13.

The advantage of this process is a shorter passage time through the apparatus in production of the preliminary material as the step in the process for applying the protective lacquer 19 (FIG. 4c) is omitted.

It is also possible to have a combination of individual steps from the three processes. In particular, starting from an embossed carrier material 17 as shown in FIG. 5a, without reflecting layer 14 (see FIG. 4b), the protective lacquer 19 can be applied by means of the printing process as in FIG. 3b or with the process illustrated in FIG. 4b. The carrier material 17 and the protective lacquer 19 in FIG. 4c advantageously differ from each other in regard to their index of refraction. In its index of refraction, the carrier material 17 is of a value of lower than 1.5 while the protective lacquer 19 over the diffraction elements 4 has an index of refraction of over 1.55. The jump in index of refraction at the interface between the carrier material 17 and the protective lacquer 19 causes strong reflection of the light which is incident on the diffraction elements 4 through the carrier material 17 so that that interface forms the reflecting layer 14 and produces the same effect. The absence of the metallic reflecting layer 14 additionally produces a strong unreleasable join between the layers at the diffraction elements 4.

A protective lacquer 19 which can be hardened by means of irradiation has the advantage that, when the protective lacquer 19 is hardened, in the depressions 21 (see FIG. 5a), a highly robust support which is stable in relation to heat is formed, for the accurately shaped relief structures 12 (see FIG. 2) in the diffraction elements 4. The stamps 3 which are made from such a material (FIG. 1), even without a stabilization layer 9 (see FIG. 2), withstand the effect of the heat which is required when the stamps 3 are applied by a hot adhesive operation or by over-lamination.

Advantageously, the carrier material 17 is transparent and at least the protective lacquer 19 (FIG. 3b) or the protective layer 13 is coloured dark or completely black as the viewer can discern the identification characteristic 8 as a conspicuously brilliant filigree-like pattern, for example in the form of fine lines in front of a dark background. If the reflecting layer 14 is not applied in accurate register relationship, reflecting non-diffracting surfaces which can be easily discerned by the naked eye occur beside the linear diffraction structures 4.

The security element can be used for ascertaining the authenticity of documents, banknotes and other items. The pattern of the security element and the features 2 which are beneath the stamp 3, such as graphic or script elements which are printed on the substrate or a watermark in the substrate are also discernible with the naked eye by a layman if, except for the reflecting layer 14, the protective layer 13 and the carrier material 17 are transparent. A quasi-transparent security element of that kind has a fine filigree-like pattern comprising the diffraction elements 4 can exhibit a brilliant play of colours depending on the incidence of light and the direction of observation, without discernibility of the graphic or script elements through the clear neutral areas 5 suffering as a result.

The quasi-transparent security element can advantageously be used for partially or totally covering the substrate 1 which is to be safeguarded against forgery, and the features 2 thereof. Personal identity cards with printing thereon and a photograph of the owner have been mentioned by way of example of such substrates 1. The graphic pattern of the stamp 3 covers over the features 2 with the fine lines or line elements whose relief structure 12 act as diffraction elements 4. Because of the high level of light-diffracting efficiency of the diffraction elements 4, a small surface proportion of the diffraction elements 4 is sufficient so that discernment of the items of information on the substrate 1 through the neutral areas 5 is not adversely affected.

The linear diffraction elements 4 advantageously have profile shapes and spatial frequencies which vary in a predetermined fashion along the 1 lines so that the visual impress ion changes in a predetermined fashion along the lines if the conditions of viewing are altered, for example due to the substrate 1 being turned or tilted. An attempt at changing the features 2 which are under the security element destroys the security element. Forgery of the pass or identity card, for example by fitting together pieces of a number of genuine passes or identity cards, can be easily detected as the fine lines of the diffraction elements are displaced at joins or continue in a broken configuration. By a tilting movement, the substrate can be easily checked by means of the striking diffraction effects, even by lay people, to ascertain whether the fine diffraction elements 4 which cover the items of information are intact, for example by checking whether the diffraction effects of the diffraction elements 4 do or do not change abruptly along the fine lines.

If the carrier material 17 is sufficiently stiff, the cards can be stamped in the credit card format directly out of the preliminary material. The pattern of the security element forms the identification characteristic 8 (see FIG. 1) and serves for example as an optical device to catch the eye. It is advantageous to use transparent or fully colourless materials for the protective layer 13, the carrier material 17 and the protective lacquer 19 if provided, as the identification characteristic 8 (see FIG. 1) is visible from both sides of the card.

Figure 6:
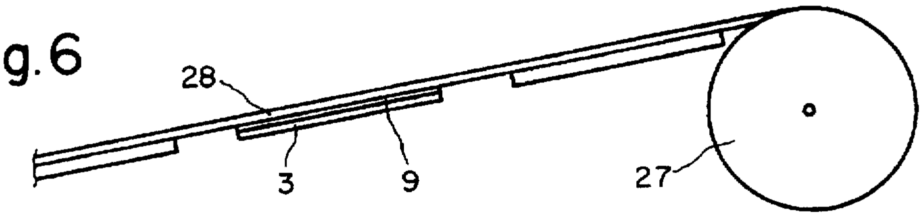
FIG. 6 shows the stamps on a carrier strip.

As shown in FIG. 6, in a separate working operation, the preliminary material in strip form can be processed for example to provide a roll of stamps as indicated at 27. That is particularly appropriate if, for technical reasons, the stamps 3 are very thin (between about 15 μm and 40 μm). The patterns of the security elements, which are regularly arranged on the preliminary material, can be stamped out in the form of stamps 3 and the stabilization layer 9 can be stuck by a cold adhesive onto a carrier foil 28 of paper or plastic material. When safeguarding a document or the pass or identity card, the stamp 3 is removed from the carrier foil 28 and stuck onto the substrate 1 (FIG. 1) and the feature 2 (FIG. 1).

Figure 7A:
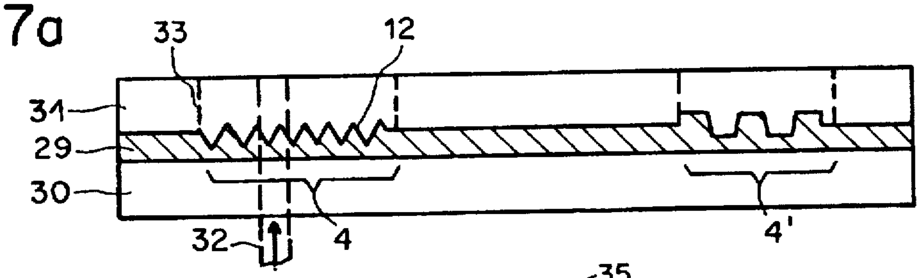
FIG. 7*a* and 7*b* show the production of an embossing tile.

The embossing dies with raised embossing structures for producing the depressions 21 (FIG. 4*a*) and the relief structures 12 (FIG. 4*a*) which are embossed at the floor of the recesses can be produced by means of the numerically controlled apparatus described in EP-A-330 738, a master structure 29 of the embossing die, as illustrated in FIG. 7*a*, being produced first.

The master structure 29 is fixed on a structure carrier 30. As soon as the master structure 29 is embossed on one side with the microscopic relief structures 12 of the pattern, it, together with the structure carrier 30, is removed from the apparatus for coating with a photoresist 31. The positively operating photoresist 31 is applied in a layer thickness of between 1 and 10 μm over the entire area over the relief structures 12 of the diffraction elements 4, 4' and over the neutral areas 5 of the exposed master structure 29 without destroying the embossed relief structures 12. The thickness of the layer of the photoresist 31 determines the height of the subsequently raised embossing structures and corresponds at least to the distance A (see FIG. 4*a*).

In a second pass the apparatus exposes the photoresist 31 to light with a writing beam 32 through the structure carrier 30 of the master structure 29, wherein the writing beam 32 is controlled by means of the same control program over the surfaces of the diffraction elements 4, 4' and irradiates the photoresist 31. The process has the advantage that the photoresist 31 is irradiated within limits 33 over the diffraction elements 4, 4' with a high degree of register accuracy as the structure carrier 30 can be accurately repositioned in the apparatus by means of pegs.

Figure 7B:
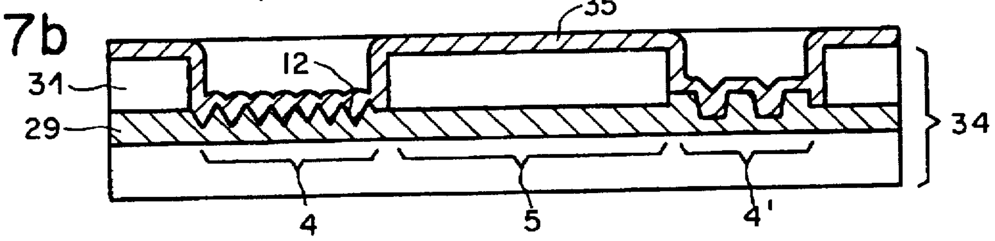

After development of the photoresist 31, what remains in FIG. 7*b* is a master mould 34 comprising the master structure 29 which has the photoresist 31 only on the unembossed surfaces which are between the surfaces of the diffraction elements 4, 4'. For example, using a galvanic process, a metal layer 35 is deposited on the surface of the master mould 34. The metal layer 35 comprises for example nickel and is an accurate negative of the master mould 34.

Production of the embossing die is also effected with a negatively operating photoresist 31 if the photoresist 31 is irradiated in the unembossed areas 5.

Figure 8:
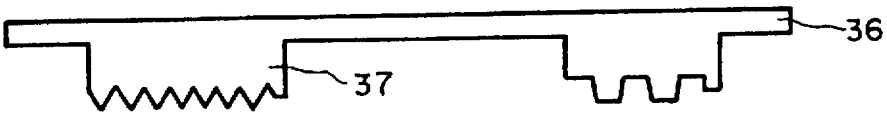
FIG. 8 shows the embossing die with raised diffraction elements.

After separation the metal layer 35 forms the embossing die 36 with raised embossing structures 37, as shown in FIG. 8, which can be used for embossing the carrier material 17.

The embossing dies 36 have the advantage that, in the embossing operation, the relief structures 12 (see FIG. 4*a*)

are produced in the depressions 21 (see FIG. 4*a*). That makes it possible to use the above-described inexpensive processes 2 and 3 which can be used in particular for the filigree-like patterns.

What is claimed is:

1. A security element comprising a carrier made of transparent plastics material and a reflective layer, the carrier having one surface as an embossing side, at least one portion of said embossing side being embossed with a pattern of linear diffraction elements with microscopic relief structures separated by unembossed neutral areas, said reflective layer covering only said embossed linear diffraction elements and leaving said unembossed neutral areas uncovered and transparent, said linear diffraction elements being optically diffractive and said unembossed neutral areas being non-diffractive and non-reflective, and said embossed linear diffraction elements and unembossed non-reflective neutral areas forming a visible pattern, wherein said visible pattern does not obstruct transparency of said security element in the neutral areas.

2. A security element as forth in claim 1, further comprising a protective layer covering the entire embossing side of said carrier, said reflective layer being located between said carrier and said protective layer, said protective layer being of the same material as said carrier.

3. A security element as set forth in claim 1, further comprising a stabilization layer, wherein said stabilization layer and the surface opposite to the embossing side of said carrier are connected by a lacquer layer to form a covering material with said linear diffraction elements embossed into the embossing side of said carrier, said covering material being transparent so that said pattern can be viewed through said covering material.

4. A security element as set forth in claim 1, further comprising a stabilization layer, wherein said stabilization layer and the surface opposite to the embossing side of said carrier are connected by a lacquer layer to form a covering material with said linear diffraction elements embossed into the embossing side of said carrier, and said covering material being transparent so that said pattern can be viewed through said coveting material, wherein said security element further comprises a protective layer covering the entire surface on the embossing side of said carrier, said reflective layer being located between said carrier and said protective layer.

5. A security element as set forth in claim 3, wherein said carrier on the embossing side is covered by an adhesive layer to adhere the security element to a substrate having an identification feature thereon, and said covering material and said adhesive are transparent, so that transparency of the security element and discernibility of of the identification feature beneath said security element are not obstructed in the neutral areas.

6. A security element as set forth in claim 2, wherein said protective layer is covered by an adhesive layer to adhere the security element to a substrate with an identification feature thereon, and said covering material and said protective and adhesive layers are transparent, so that transparency of the security element and discernibility of the identification feature beneath said security element are not obstructed in the neutral areas.

7. A security element as set forth in claim 1, wherein said linear diffraction elements are lines or dots having a width of less than 0.5 mm and are spaced apart by said unembossed neutral areas and form said pattern.

8. A security element as set forth in claim 1 or 3, wherein said carrier is adapted to be glued onto a substrate having an identification feature thereon by an adhesive layer being applied on the embossing side of said carrier and covering the entire substrate having an identification feature thereon completely, so that said reflective layer covering the linear diffraction elements is enclosed between the adhesive and the carrier, and said layers over the substrate are transparent so that discernability of the identification feature beneath the security element is not obstructed in said neutral areas.

9. A security element as set forth in claim 1, wherein the sum of the surface areas of said neutral areas which are between said diffraction linear elements is greater than the sum of the surface areas of said diffraction elements.

10. A security element as set forth in claim 1, wherein said microscopic relief structure is comprised of depressions which extend to a depth into said carrier layer of at least one micrometer beneath the level of said unembossed neutral areas.

11. A security element as set forth in claim 10, wherein said depressions are filled with a transparent protective lacquer having an index of refraction different from that of the covering material, so that the interface between the covering material and the protective lacquer acts as said reflective layer due to a change in index of refraction.

12. An embossing die for embossing the security element as set forth in claim 1, said die having raised embossing structures for producing a mesa structure with depressions in said carrier at the areas to be reflective, said raised embossing structure having flat tops with said microscopic relief structures, wherein the raised embossing structures reproduce said microscopic relief structures at the floor of the depressions, said embossing structures corresponding to said linear diffraction elements of said security element, said microscopic relief structures on top of said raised embossing structures of said die being raised above a plane defined for said neutral areas of said security elements.

13. A security element as set forth in claim 2, 4 or 11 wherein said protective layer is cured with radiation.

14. The security element of claim 4 wherein said protective layer is the same material as said carrier.

15. A security element as set forth in claim 4, wherein said protective layer is covered by an adhesive layer to adhere the security element to a substrate with an identification feature thereon, and said covering material and said protective and adhesive layers are transparent, so that transparency of the security element and discernibility of the identification feature beneath said security clement are not obstructed in the neutral area.

16. A security element comprising a carrier of light absorbent plastics material and a reflective layer, the carrier having one surface as an embossing side, at least one portion of said embossing side being embossed with a pattern of linear diffraction elements with microscopic relief structures separated by unembossed neutral areas, said reflective layer covering only said embossed linear diffraction elements and leaving said unembossed neutral areas uncovered and absorbent, said linear diffraction elements being optically diffractive and said non-embossed neutral areas being non-diffractive and non-reflective, and said embossed linear diffraction elements and unembossed non-reflective neutral areas forming a visible pattern covered by a transparent protective layer.

* * * * *